United States Patent [19]
Sprague et al.

[11] Patent Number: 5,138,340
[45] Date of Patent: Aug. 11, 1992

[54] TEMPERATURE CONTROLLED LIGHT SOURCE FOR INTERLACED PRINTER

[75] Inventors: Robert A. Sprague, Saratoga; Mark S. Bernstein, Belmont; Robert P. Kowalski, Campbell; David L. Hecht, Palo Alto; David L. Steinmetz, Mountain View; David E. Kizer, San Jose; Robert L. Thornton, East Palo Alto, all of Calif.

[73] Assignee: Xerox Corporation, Rochester, N.Y.

[21] Appl. No.: 624,117

[22] Filed: Dec. 6, 1990

[51] Int. Cl.$^5$ .............................................. G01D 15/14
[52] U.S. Cl. ................................................... 346/108
[58] Field of Search .................. 346/1.1, 107 R, 108, 346/160, 150; 372/29, 32, 34, 100

[56] References Cited

U.S. PATENT DOCUMENTS

| | | | |
|---|---|---|---|
| 4,281,904 | 9/1981 | Sprague et al. | 350/356 |
| 4,369,457 | 1/1983 | Sprague | 346/160 |
| 4,396,252 | 10/1983 | Turner | 350/355 |
| 4,450,459 | 5/1984 | Turner et al. | 346/160 |
| 4,514,739 | 4/1985 | Johnson et al. | 346/108 |
| 4,673,953 | 6/1987 | Hecht | 346/108 |
| 4,679,057 | 7/1987 | Hamada | 346/108 X |
| 4,701,607 | 10/1987 | El-Hanany et al. | 372/34 X |
| 4,815,058 | 3/1989 | Nakamura et al. | 346/76 L X |
| 4,918,681 | 4/1990 | Ikeda | 372/29 |
| 4,940,314 | 6/1990 | Hecht | 350/355 |

FOREIGN PATENT DOCUMENTS 0204292  11/1984  Japan ..................... 372/34

OTHER PUBLICATIONS

R. L. Thornton, "Impurity Induced Disordering of . . . ", SPIE vol. 797, Adv. Pro. of Semi. Devices, 1987, pp. 177–184.

R. L. Thornton, "Opto-Electronic Device Structures . . . ", JOCG 77, North-Holland Amsterdam, 1986, pp. 621–628.

R. L. Thornton, "High Power (2.1 W) 10-Stripe Al-GaAs . . . ", Appl. Physics Ltrs., vol. 49, Dec. 1988, No. 23, pp. 1572–1574.

R. L. Thornton et al., "Highly Efficient Multiple Emitter . . . ", Appl. Phy. Ltrs., vol. 48, Jan. 1986, No. 1, pp. 7–9.

R. L. Thornton et al., "Low Threshold Planar Buried . . . ", Appl. Phy. Ltrs., vol. 47, Dec. 1985, No. 12, pp. 1239–1241.

R. L. Thornton et al., "Highly Efficient, Long Lived (List continued on next page.)

*Primary Examiner*—Benjamin R. Fuller
*Assistant Examiner*—David Yockey
*Attorney, Agent, or Firm*—Townsend and Townsend

[57] ABSTRACT

A technique for producing pixel patterns at different selected wavelengths. A diode laser is repeatedly pulsed and has its temperature changed from pulse to pulse, which causes the output wavelength to change. This allows pixel patterns to be interlaced by the use of dispersive elements such as prisms in the optical train. A temperature shift of about 15° C. provides a wavelength shift of about 30 angstroms, which is usable. A temperature shift of 20° C.–30° C. or more is preferable. The temperature shifts may be accomplished by supplying specific currents below threshold and above threshold. For two-wavelength operation, the laser is driven at a first bias current below threshold for a first non-illumination interval, at a first pulse current above threshold for a first illumination interval, at a second bias current below threshold for a second non-illumination interval, and a second pulse current above threshold for a second illumination interval. The bias currents are sufficiently different so as to establish different operating temperatures for the illumination intervals. The temperature shifts may also be accomplished at least in part by use of an auxiliary heater.

40 Claims, 5 Drawing Sheets

OTHER PUBLICATIONS

AlGaAs . . . " Appl. Phy. Ltrs., vol. 49, Jul. 1986, No. 3, pp. 133-134.

Robert A. Sprague, William D. Turner, Lawrence N. Flores; "Linear Total Internal Reflection Spatial Light Modulator for Laser Printing"; SPIE; vol. 299; 1982.

William D. Turner, Robert A. Sprague; "Advances in Laser Scanning Technology"; SPIE; vol. 299; Aug. 27-28, 1981.

Robert A. Sprague, William D. Turner, David L. Hecht, Richard V. Johnson; "Advances in Laser Scanning and Recording"; SPIE; vol. 396; Apr. 19-20, 1983.

Richard V. Johnson, David L. Hecht, Robert A. Sprague, Lawrence N. Flores, David L. Steinmetz, William Turner; "Characteristics of the Linear Array Total Reflection (TIR) Electrooptic Spatial Light Modulator for Optical Information"; Optical Engineering; Nov., Dec. 1983; vol. 22 No. 6; pp. 665-674.

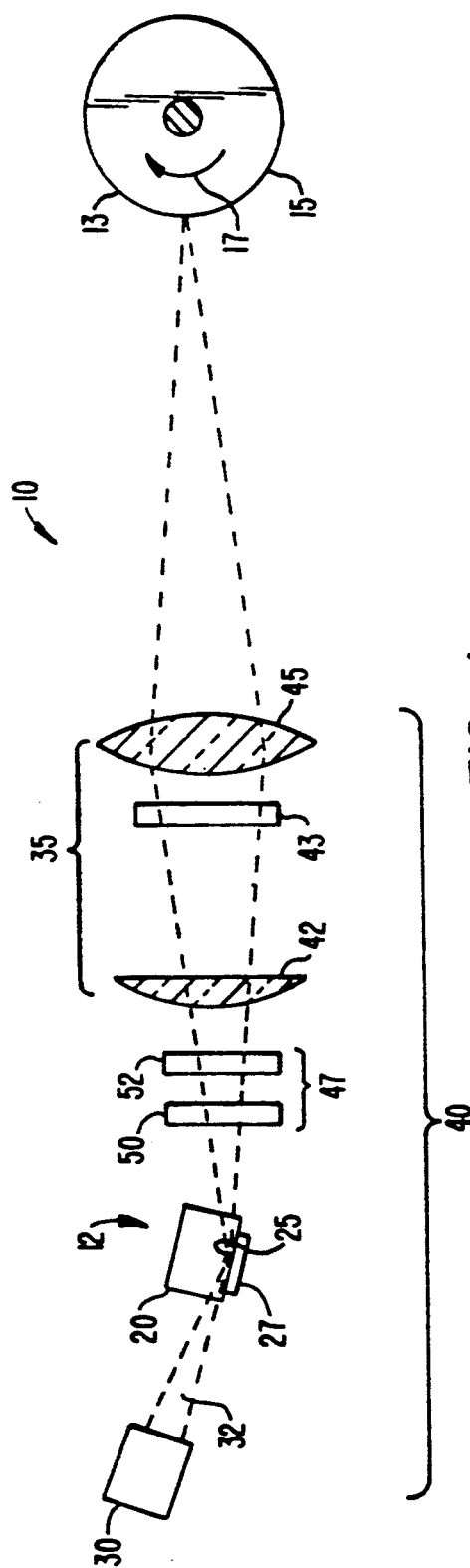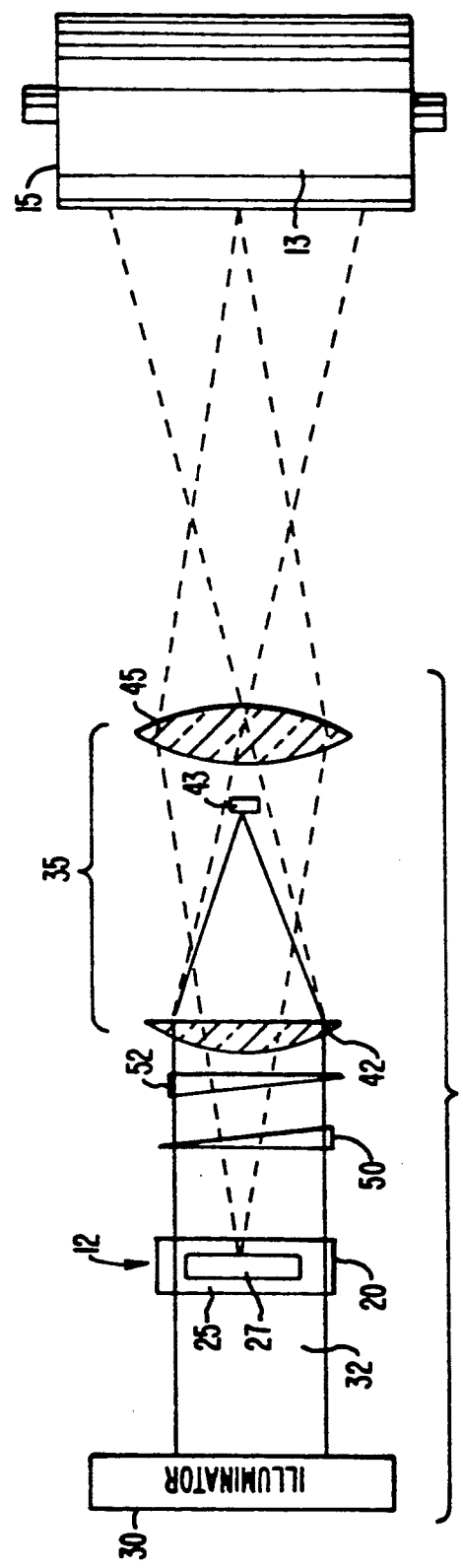

TEMPERATURE CONTROLLED LIGHT SOURCE FOR INTERLACED PRINTER

BACKGROUND OF THE INVENTION

The present invention relates generally to laser printers, and more particularly to a light source for an interlaced printer and optical image bar.

As a matter of definition, an "optical image bar" comprises an array of optical pixel generators for converting a spatial pattern, which usually is represented by the information content of electrical input signals, into a corresponding optical intensity profile. Although there are a variety of applications for such devices and a number of different fields, a significant portion of the effort and expense that have been devoted to their development has been directed toward their application to electrophotographic printing.

One type of image bar is based on the use of total internal reflection electro-optic spatial light modulators, as described in U.S. Pat. No. 4,396,252 to W. D. Turner, hereby incorporated by reference. The modulator comprises a set of laterally separated, individually addressable electrodes, which are maintained closely adjacent a reflective surface of an optically transparent electro-optic element, such as a lithium niobate crystal. In operation, substantially the full width of the electro-optic element is illuminated by a transversely collimated light beam. This light beam is applied to the electro-optic element at a near grazing angle of incidence with respect to its reflective surface, and is brought to a wedge-shaped focus on that surface so that it is totally internally reflective therefrom.

Voltages representing a linear pixel pattern are applied to the individually addressable electrodes, whereby localized fringe electric fields are coupled into the electrooptic element. These fields produce localized variations in the refractive index of the electro-optic element, so the wavefront of the light beam is spatially phase modulated in accordance with the pixel pattern as it passes through the electro-optic element. The process is repeated for a sequence of pixel patterns, with the result that the wavefront of the light beam is spatially modulated as a function of time in accordance with successive ones of those patterns.

For image bar applications of such a modulator, schlieren optics are employed to convert the phase modulated wavefront of the light beam into a corresponding series of optical intensity profiles. If a printing function is being performed, these intensity profiles are in turn used to expose a photosensitive recording medium, such as a xerographic photo receptor, in accordance with the image defined by the successive pixel patterns.

U.S. Pat. No. 4,940,314, issued Jul. 10, 1990, to D. L. Hecht, hereby incorporated by reference, addresses the problem that the effective diameter of the pixels produced by an electro-optic image bar, as measured between their half power points at unity magnification, is approximately one-half the center-to-center spacing of its electrodes. Accordingly, such image bars not only tend to cause image distortion because of spatial quantization errors, but also characteristically produce inter-pixel intensity nulls.

The patent describes a technique wherein a discrete optical image bar sequentially generates a plurality of independent pixel patterns at different center wavelengths, and a prism system disperses those pixel patterns in accordance with their respective wavelengths to passively increase the spatial addressing capacity of the image bar. The wavelengths of the pixel patterns, the angular dispersion of the prism system, and the length of the optical arm along which the dispersion has effect are selected so that the pixel patterns are laterally offset from one another on the output image plane by a distance that is less than the center-to-center spacing of the pixels of any one of those patterns. As a general rule, the wavelength of the pixel patterns is cyclically or otherwise recurrently varied, so that the pixel patterns are interlaced in accordance with a predetermined lattice-like interlacing pattern.

SUMMARY OF THE INVENTION

The present invention is drawn to a technique, applicable to a laser printer such as one incorporating an optical image bar, for producing pixel patterns at different selected wavelengths.

The light source for the present invention is a diode laser or a diode laser array (referred to generically as the laser), which is repeatedly pulsed, once for each pixel pattern. According to the invention, the laser has its temperature changed from pulse to pulse, which causes the output wavelength to change. This allows pixel patterns to be interlaced by the use of dispersive elements such as prisms in the optical train. A temperature shift of about 15° C. provides a wavelength shift of about 30 angstroms, which is usable. A temperature shift of 20°C.–30°C. or more is preferable.

According to one aspect of the invention, the temperature shifts are accomplished by supplying specific currents below threshold and above threshold. For two-wavelength operation, the laser is driven at a first bias current below threshold for a first non-illumination interval, at a first pulse current above threshold for a first illumination interval, at a second bias current below threshold for a second non-illumination interval, and at a second pulse current above threshold for a second illumination interval. The non-illumination intervals are sufficiently longer than the laser's thermal time constant and the bias currents sufficiently different so as to establish different operating temperatures for the illumination intervals. The illumination intervals are shorter than the laser's thermal time constant so that the temperature remains substantially at the established temperature throughout the pulse. In order to have sufficiently different bias currents below threshold, the laser must be characterized by a sufficiently high threshold current and thermal impedance.

According to another aspect of the invention, the temperature shifts are accomplished at least in part by use of an auxiliary heater. For two-wavelength operation, the laser is operated below threshold during the two non-illumination intervals, but the auxiliary heater is activated during the second non-illumination interval. Additional differential heating may be achieved by operating the laser at a higher bias current during the second non-illumination interval.

Possible differences in the laser efficiency at the two temperatures can be compensated by making the two illumination intervals of different duration or making the two pulse currents different, so long as the same integrated pulse energy is obtained for each of the two pulses. Indeed, the pulse currents need not be constant during the illumination intervals, but could be caused to droop so that the temperature, and hence the wavelength will remain more constant throughout the pulse.

The duty cycle of the pulses is preferably low enough to accommodate loading of the data (establishing the correct voltages on the electro-optic modulator electrodes) between pulses. This is consistent with having a thermal time constant that is long compared to the pulse duration and short compared to the interval between pulses.

A further understanding of the nature and advantages of the present invention may be realized by reference to the remaining portions of the specification and the drawings.

BRIEF DESCRIPTION OF THE DRAWINGS

FIG. 1 is a schematic side view of the optical train of a printer incorporating the present invention;

FIG. 2 is a top view of the optical train of the printer;

DESCRIPTION OF SPECIFIC EMBODIMENTS

System Overview

Figure 3:
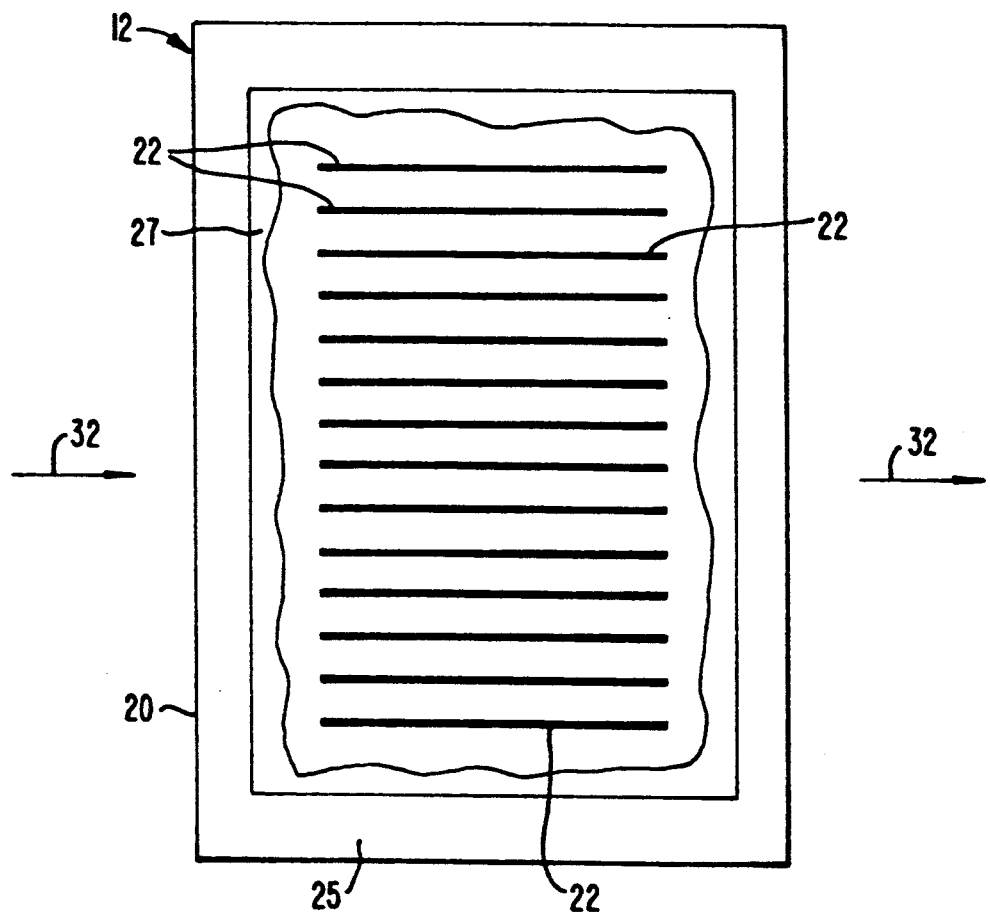
FIG. 3 is a partly cut away bottom view of the electro-optic modulator.

FIGS. 1 and 2 are schematic side and top views illustrating the optical train of a line printer 10 having an electro-optic spatial light modulator 12 for printing an image on a photosensitive recording medium 13 As shown, the recording medium is a photoconductively coated drum 15 which is rotated by any convenient drive mechanism in the direction of the arrow 17. Nevertheless, other xerographic and non-xerographic recording media, including photoconductively coated belts and plates, as well as photosensitive films and coated papers could be used. Thus, in the generalized case, recording medium 13 should be visualized as being a photosensitive medium which is exposed while advancing in a cross-line or line pitch direction relative to modulator 12.

FIG. 3 is a partially cut-away bottom view of electro-optic spatial light modulator 12. In keeping with standard practices, the modulator comprises an optically transparent electro-optic element 20, such as an optically polished, y-cut crystal of lithium niobate, and a plurality of individually addressable electrodes 22. Electrodes 22 are deposited on, or held closely adjacent, a longitudinal reflective surface 25 of electro-optic element 20. For example, they may be integrated with their addressing and drive electronics on a VLSI silicon circuit 27, and the modulator may then be assembled so that the electrodes are pressed against the reflective surface (by any convenient mechanism, not shown). Typically, electrodes 22 extend lengthwise along electro-optic element 20 and are transversely spaced on more or less uniformally displaced centers.

In operation, an illuminator 30, to be described below, supplies a transversely collimated light beam 32 which is expanded by any convenient optical elements not shown) if and as required to illuminate substantially the full width of electro-optic element 20. This light beam is brought to a wedge shaped focus at a near grazing angle of incidence on the reflective surface of the electro-optic element and is totally internally reflected therefrom. Successive sets of data samples are sequentially applied to electrodes 22, whereby the phase. front of light beam 32 is spatially modulated while passing through electro-optic element 20 in accordance with successive pixel patterns as a function of time. Moreover, as will be described below, in keeping with this invention, the wavelength of light beam 32 is also varied as a function of time, so that the successive pixel patterns may be passively interlaced.

A central dark field or central bright field Schlieren imaging system 35 (FIGS. 1 and 2) converts the phase modulated wavefront of light beam 32 into a corresponding intensity profile. The combination of modulator 12 with variable wavelength illuminator 30 and Schlieren imaging system 35 is an example of what is referred to herein as a variable wavelength discrete image bar 40.

A central dark field system suitably includes a field lens 42 for focusing the transversely collimated zero order diffraction components of light beam 32 (collectively represented by solid line rays in FIG. 2) onto an opaque stop 43. The zero order components of light beam 25 are blocked because the stop is centrally located in the rear focal plane of the field lens, but the higher order diffraction components (collectively represented by broken line rays in FIG. 2, together with broken line cones for a single pixel) scatter around stop 40 and are collected by an imaging lens 45. Lens 45, in turn, focuses them on recording medium 13 with a predetermined magnification.

Alternatively, a central bright field system (not shown) could be used to perform the conversion process, although it will be understood that such a change would reverse the logical relationship of the individual pixels within the intensity profile to the localized phase modulation of the wavefront of light beam 32 (i.e., "bright" pixels would become "dark" pixels, and viceversa, unless steps were taken to account for the reversal in the logical relationship).

A prism system 47 is disposed in the optical path, for angularly dispersing light beam 32 in accordance with its wavelength. The light beam is, of course, the carrier for the pixel patterns generated by image bar 40, so successive pixel patterns are angularly dispersed by the prism system 47 because of the pixel-pattern-to-pixel-pattern variations in the wavelength of the light beam. Thus, for convenience, the center wavelength of light beam 32 as spatially modulated in accordance with a given pixel pattern is sometimes referred to herein as "the center wavelength of the pixel pattern" or, even more concisely, simply as "the wavelength of the pixel pattern." The dispersion caused by prism system 47 is lateral or, in some cases, both lateral and sagittal, so that the centers of the pixels of successive pixel patterns are laterally displaced from one another on recording medium 13 by a distance which is less than the center-to-center displacement of the pixels of any one of those patterns.

For an electro-optic image bar as shown, prism system 47 is suitably disposed between modulator 12 and Schlieren imaging system 35. The prism system may cause sufficient angular deviation of the dispersed light beam to warrant laterally offsetting the optical axis of imaging system 35 from the optical axis of modulator 12, but it has been assumed for purposes of this disclosure that the average deviation, if any, is so slight that it may be neglected. Indeed, as is known, there are so-called direct view prisms which are characterized by having an average deviation of zero. Here, however, the average deviation of the dispersed light beam is merely a second order consideration because imaging system 35 is telecentric (i.e., it is designed on the assumption that all principal rays of the image are substantially normal to the surface of the object being imaged).

For that reason, the preferred prism system 47 comprises an optically aligned and oppositely oriented pair of substantially identical prisms 50 and 52 which are separated from one another by a predetermined optical distance. Such a system ensures that the angular dispersion of light beam 32 that is produced by prism 50 is equalized by the substantially equal, but opposite dispersion that is produced by prism 52 so that the telecentricity of light beam 32 is effectively restored, even though its different wavelength components are now displaced from one another. As will be appreciated, the amount of displacement that is created between any two wavelengths depends on the relative angular dispersion of those wavelengths by prism 50 and the optical distance between prisms 50 and 52 (i.e., the effective optical arm length of the dispersion).

Figure 4:
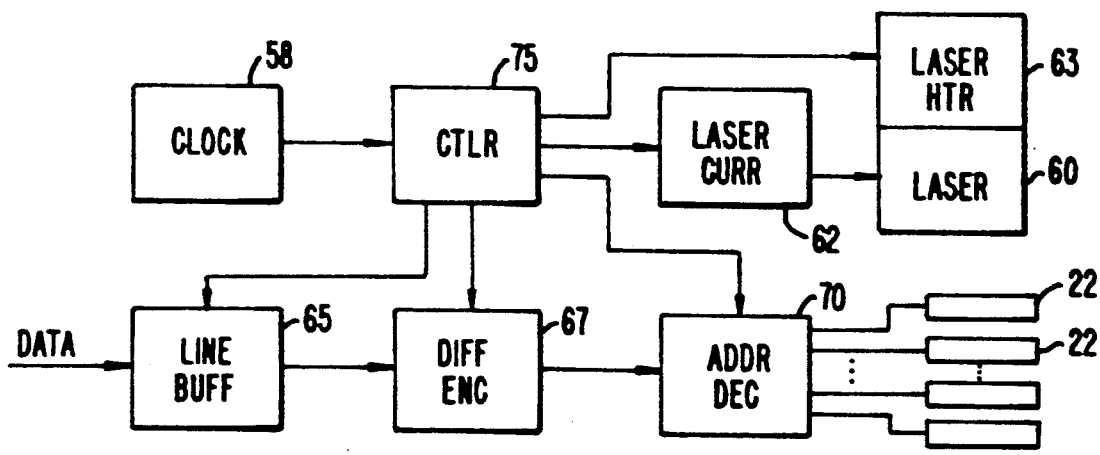
FIG. 4 is a simplified block diagram of the electronic control system of the printer.

FIG. 4 is a block diagram illustrating circuitry for communicating data to electrodes 22 and controlling illuminator 30. Basic timing for the circuitry and the operations described below is established by a clock generator 58.

In a preferred embodiment, illuminator 30 comprises a diode laser array 60, and has associated therewith a laser driver 62 for driving a current having a particular time dependence to the laser. Optionally associated with laser 60 is a laser heater 63.

An incoming data stream is input to a data buffer 65, encoded at a differential encoder 67, and communicated to address decoding circuitry 70. A controller 75 manages the data flow through the buffer and encoder, and provides sequential addresses to decoding circuitry 70 so as to cause a line of data to be applied to electrodes 22 during a data loading interval. Voltages corresponding to the data values are held on the electrodes during a subsequent data hold interval, and the process is repeated.

Controller 75 also generates suitable control signals for laser driver 62 to define a sequence of illumination intervals and non-illumination intervals. Each illumination interval occurs entirely within a corresponding data hold interval. Consequently, each non-illumination interval extends beyond a corresponding data load interval.

Two-Wavelength Laser Operation

Figure 5A:
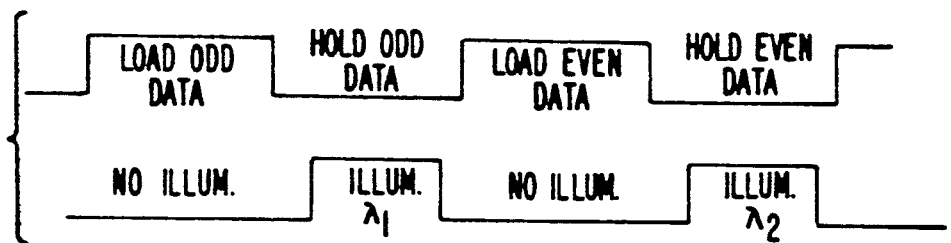
FIGS. 5A-E are timing diagrams showing the data loading and laser energization according to the present invention.

FIG. 5A is a timing diagram illustrating the sequence of operations for two-way interlace. The basic mode of operation that will be described is a two-way interlace where laser 60 is energized so as to emit light at first and second wavelengths $\lambda_1$ and $\lambda_2$ during alternating illumination intervals. The techniques are extendible to more than two-way interlace.

The differential encoding and electrode addressing define spaced alternating intervals designated "load odd data" and "load even data". Although the diagram shows the load and hold intervals of equal length, this need not be the case. Interspersed with these intervals are intervals designated "hold odd data" and "hold even data". The laser is driven in a manner that its temperature (and hence its output wavelength) changes from pulse to pulse.

Figure 5B:
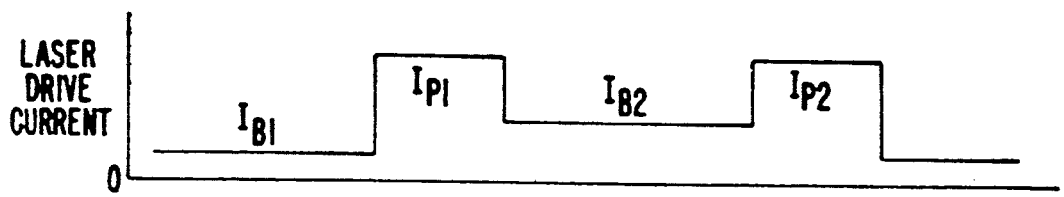

FIG. 5B is a timing diagram showing the laser drive current. In this embodiment, the temperature shifts are accomplished by supplying different currents below threshold during the non-illumination intervals. For the two-wavelength operation, the laser is driven in a sequence that includes a first bias current $I_{B1}$ below threshold, a first pulse current $I_{P1}$ above threshold, a second bias $I_{B2}$ current below threshold, and a second pulse current $I_{P2}$ above threshold. The non-illumination intervals are sufficiently longer than the laser's thermal time constant and the bias currents are sufficiently different from each other so as to establish different operating temperatures for the illumination intervals. The illumination intervals are shorter than the laser's thermal time constant so that the temperature remains substantially at the established temperature during the pulse.

Figure 5C:
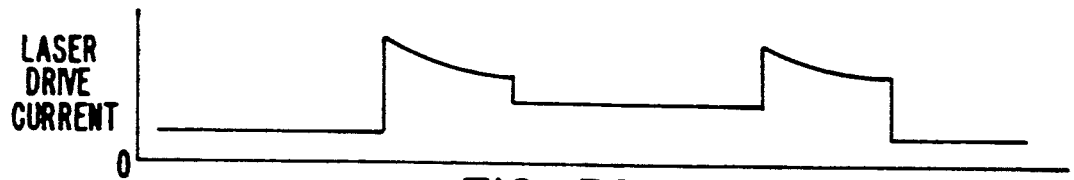
Figure 5D:
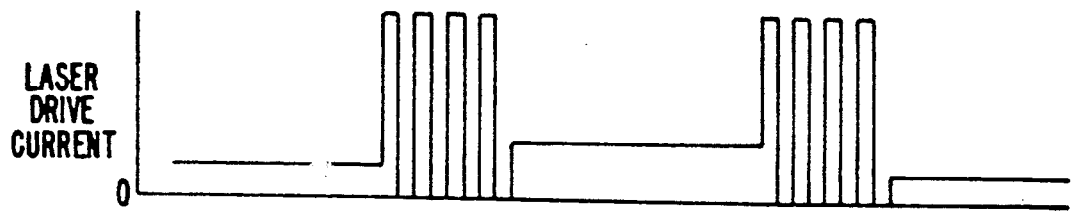

FIGS. 5C and 5D show alternative drive current configurations. In FIG. 5C, the pulse current is decreased over the illumination interval. In FIG. 5D, the current profile is a burst of short pulses during the illumination interval. These alternative current profiles tend to provide temperature stabilization over the illumination interval, thereby causing the wavelength to remain more constant.

Figure 5E:
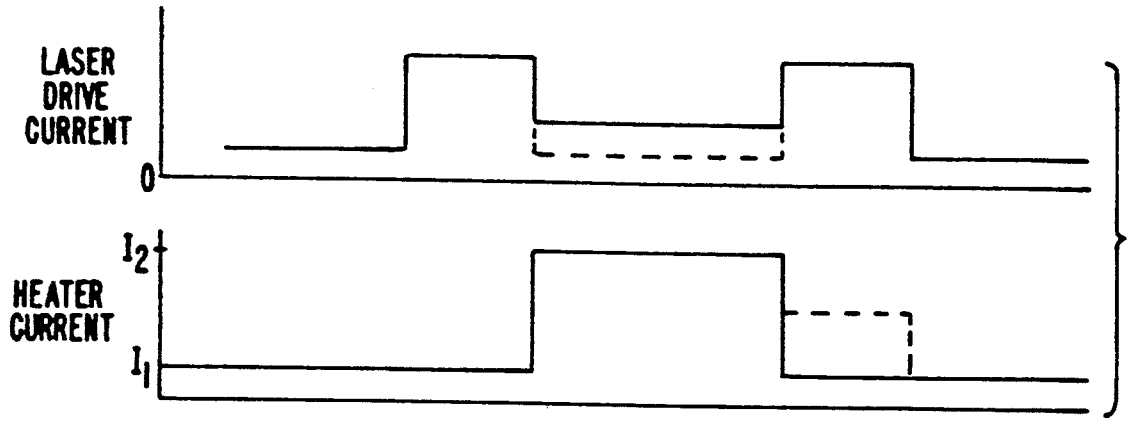

FIG. 5E shows the use of laser heater 63. The separate heater is used for those situations where the desired temperature differential cannot be achieved solely by means of bias current differential. The heater is run at a first current $I_1$ (which may be zero) during the first non-illumination interval and the first illumination interval. The heater is then run at a second, higher, current $I_2$ during a sufficient portion of the second non-illumination interval to elevate the laser temperature, and is preferably run at $I_1$ during the second illumination interval. The heater may, however, be run above $I_1$ during the second illumination interval if necessary (as shown in phantom). Although the diagram shows different bias currents for the two non-illumination intervals, such might be unnecessary if the heater output is sufficient to establish the desired temperature difference. This is shown schematically by having a second bias current, equal to the first, shown in phantom.

In all these cases, it is important that the integrated pulse energy is the same for all illumination intervals. Accordingly, to the extent that there are differences in the laser efficiency at the two temperatures, it may be necessary to have the pulses of different duration or height.

Typical operation would be at 40 KHz with a duty cycle of 25%. This implies 6.25-$\mu$sec illumination pulses separated by 18.75-$\mu$sec non-illumination intervals.

Although, as will be described below, there are many degrees of freedom in the design of specific embodiments, it is generally contemplated that the operation temperatures during the first and second illumination intervals will differ by at least 15°C.

Specific Numerical Examples

Figure 6:
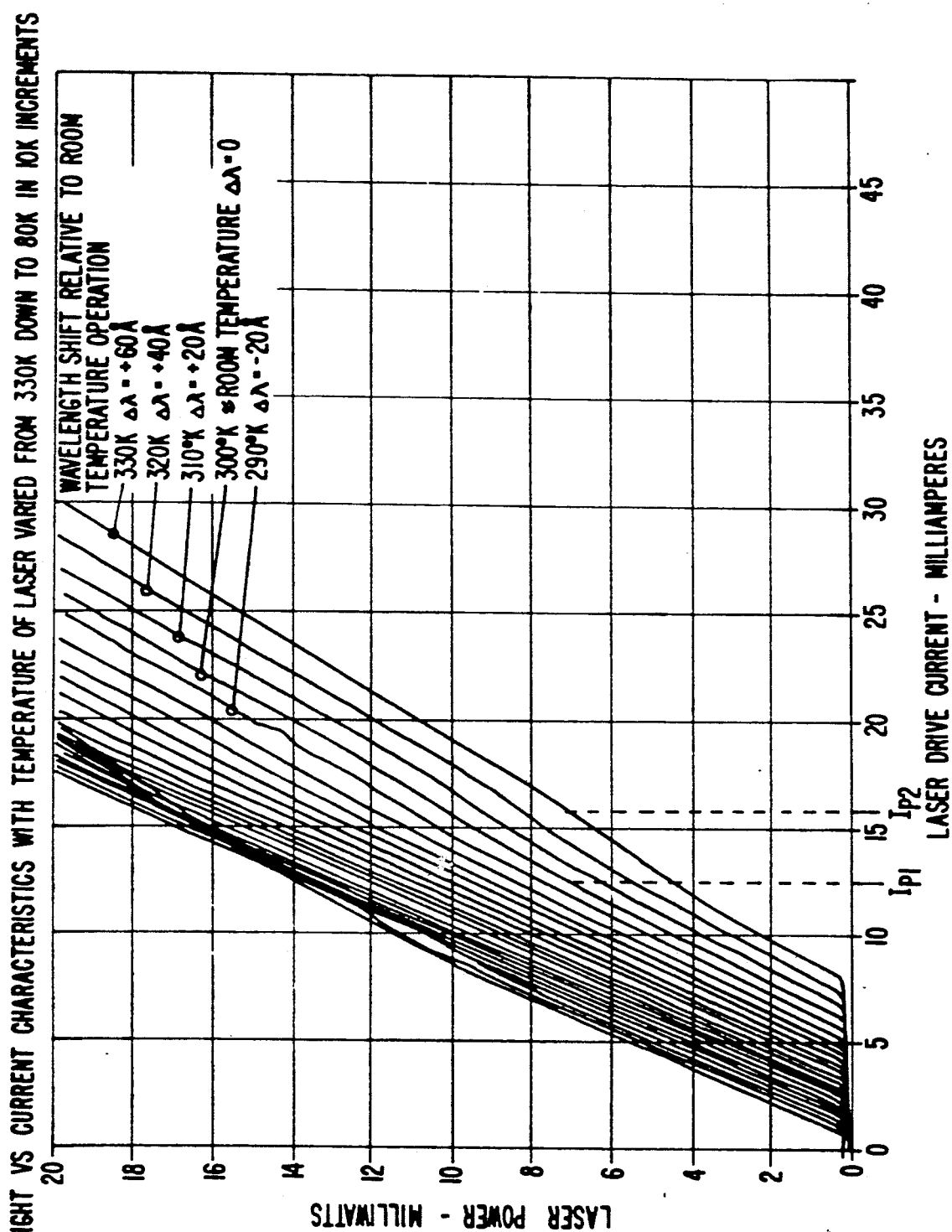
FIG. 6 shows operating characteristics for a laser as might be used for practicing the present invention.

FIG. 6 shows the laser output power as a function of current for an aluminum gallium arsenide buried heterostructure semiconductor laser operated at a number of temperatures. For diode lasers of this type, the wavelength shift is approximately 2 angstroms/°C. Thus a temperature difference of 30° C. between the first and second illumination intervals would result in a wavelength difference of 60 angstroms. A suitable pair of temperatures for providing this shift is 300°K. (approximately room temperature) and 330° K. For the particular laser illustrated, operating currents $I_{P1}$ and $I_{P2}$ of about 12.5 ma at 300° K. and 16 ma at 330° K. each provide about 7 mw output power.

The particular laser illustrated has a threshold current of about 7 ma at 300° K. For a 2-volt drop this represents about 15 mw of power dissipation. The thermal impedance may typically be about 100° C./watt, so it would take about 300 mw to raise the laser temperature by 30° C. Under these conditions, an auxiliary heater would be required.

It is possible, however, to provide a narrow aperture laser with a thermal impedance of about 200° C./watt and a threshold current of about 50 ma. Such a laser operating below threshold at 2 volts would dissipate 100 mw and thus undergo a 20° C. temperature rise. Under these conditions, an auxiliary heater would probably not be required. It is noted that such a laser is relatively inefficient, but the inefficiency is put to good use.

A typical thermal time constant for lasers such as those considered here is on the order of 15 μsec. This may be somewhat long for the 40-KHz operation mentioned above. A very efficient heat sink may be used to accelerate cooldown, but that would slow down warmup. However, a robust external heater could then be used to compensate.

Figure 7:
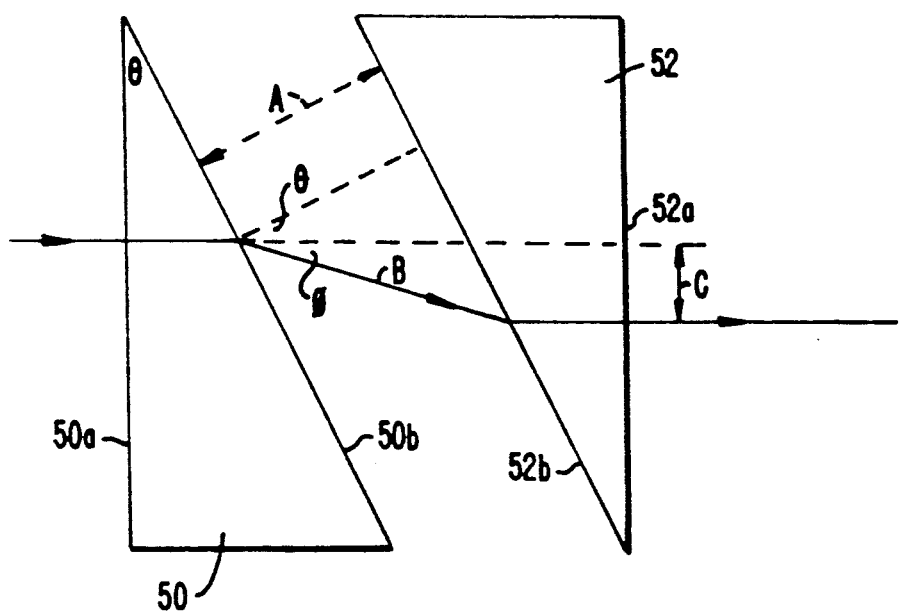
FIG. 7 is a schematic view of the prisms located in the optical train.

FIG. 7 is an exaggerated schematic view of prisms 50 and 52. Assume that the prisms are characterized by an angle $\theta$, have their remote surfaces 50a and 52a perpendicular to the incident beam direction and their facing surfaces 50b and 52b parallel to each other and separated by a distance A. As is well known, the beam entering prism 50 at normal incidence to surface 50a is refracted at surface 50b by an angle $\phi$ that depends on the index of refraction n and the prism angle $\theta$ as follows:

$$\sin(\theta + \phi) = n\sin\theta \qquad (1)$$

$$\text{or } \phi = \arcsin(n\sin\theta) - \theta \qquad (2)$$

The beam travels a distance B between the prisms and impinges on surface 52b. It is again refracted so as to proceed and emerge from prism 52 parallel to its original direction.

The transverse (vertical in FIG. 6) displacement C then be determined by elementary trigonometry as follows:

$$B = A/\cos(\theta + \phi) \qquad (3)$$

$$C = B\sin\phi = A\sin\phi/\cos(\theta + \phi) \qquad (4)$$

Equation (2) can be substituted into Equation (4) to yield C in terms of n, A, and $\theta$.

For a second wavelength, the value of n is different, and the corresponding value of C is different. A desired differential between the displacements for two wavelengths can be achieved in many ways. An easy way to understand this is to approximate the equations based on the assumption that $\theta$ (and hence $\phi$) are small angles. To first order, Equation (4) becomes $$C = A(n-1)\theta \qquad (5)$$

and the differential displacement is given by $$\Delta C = A\theta(\Delta n) \qquad (6)$$

At this point one can look for practical parameters given a desired value of $\Delta C$.

Consider first the example given in the above-referenced U.S. Pat. No. 4,940,314 for the case where the two wavelengths differ considerably. For Schott BK-7 optical glass and two lasers operating at wavelengths of 7550 angstroms and 8200 angstroms, (differing by 650 angstroms) the refractive indices are 1.51032 and 1.51170 so that $\Delta n = 0.00138$. Assuming a desired differential displacement of 0.005 mm and a prism separation of 50 mm, Equation (6) can be solved to yield $\theta = 0.0725$ radians or 4.15°.

As discussed above, the wavelength differences readily achievable by the present invention (operating the same laser at different temperatures) are generally an order of magnitude smaller, and therefore would require a more dispersive prism material, a larger prism angle, a greater prism separation, or a combination of the above.

A suitable way of increasing the dispersive displacement by an order of magnitude would be to increase the prism separation by a factor of 5 and the prism angle by a factor of 2. The increased separation tends to introduce non-negligible astigmatism since the air gap between the prisms acts as a tilted plate. (A discussion of the astigmatism of a tilted plate can be found at pp. 82-84 of Modern Optical Engineering by Warren Smith (McGraw-Hill 1966)). The astigmatism can be corrected by the use of one or more cylindrical lens elements having their principal axes parallel to the axis of the modulator, as is well known in the art.

Conclusion

In conclusion it can be seen that the present invention provides an elegant technique for interlacing pixel patterns. While the above is a complete description of the preferred embodiments of the invention, various alternatives, modifications, and equivalents may be used. For example, while the above description is in terms of a printer using an electro-optic total internal reflection spatial modulator, the invention could find use in other printers, such as a multibeam polygon ROS (raster output scan) device. Therefore, the above description should not be taken as limiting the scope of the invention which is defined by the appended claims.

What is claimed is:

1. In a printer having a diode laser and control electronics for applying data signals to a beam emitted by the laser, the improvement comprising:

means, synchronized with the control electronics, for establishing a series of sequences, each sequence including a first non-illumination interval, a first illumination interval, a second non-illumination interval, and a second illumination interval;

means, operable for each sequence of the series, for passing first and second pulse currents through the laser during respective first and second illumination intervals; and means, operable during at least one of the first and second non-illumination intervals of each sequence of the series, for establishing different first and second operating temperatures of the laser for the first and second illumination intervals;

whereby the laser emits light during the first and second illumination intervals at different wavelengths due at least in part to the different operating temperatures established during the first and second non-illumination intervals.

2. The improvement of claim 1 wherein the first and second pulse currents have respective magnitudes and the first and second illumination intervals have respective durations such that total energy emitted by the laser is identical for the first and second illumination intervals.

3. The improvement of claim 1 wherein the first pulse current is substantially constant during the first illumination interval.

4. The improvement of claim 1 wherein the sequences occur without intervening time intervals between sequences.

5. The improvement of claim 1 wherein the means for establishing different first and second operating temperatures comprises means for passing first and second bias currents through the laser during the respective first and second non-illumination intervals, the first and second bias currents being below threshold and being sufficiently different so as to establish at least a significant portion of the difference between the first and second operating temperatures.

6. The improvement of claim 5 wherein the laser is characterized by a sufficiently high threshold current and thermal impedance that the first and second bias currents differ sufficiently that the operating temperatures differ by at least 15° C.

7. The improvement of claim 1 wherein the means for establishing different first and second operating temperatures comprises:
 an external heater thermally coupled to the laser; and
 means for energizing the heater during only one of the first and second non-illumination intervals.

8. The improvement of claim 1 wherein the printer includes an optical image bar.

9. The improvement of claim 8 wherein the printer includes at least one dispersive element in the path of the beam emitted by the source so as to provide a lateral offset between pixel patterns resulting from the different wavelengths.

10. The improvement of claim 1 wherein the wavelengths differ by at least 30 angstroms.

11. The improvement of claim 1 wherein the printer includes at least one dispersive element in the part of the beam emitted by the laser so as to provide a lateral offset between printed patterns resulting from the different wavelengths.

12. The improvement of claim 1 wherein the first pulse current decreases during the first illumination interval.

13. The improvement of claim 1 wherein the first pulse current comprises a plurality of spaced pulses occurring during the first illumination interval.

14. In a printer a having a diode laser characterized by a threshold and control electronics for applying data signals to a beam emitted by the laser, the improvement comprising:
 means, synchronized with the control electronics, for establishing a series of sequences, each sequence including a first non-illumination interval, a first illumination interval, a second non-illumination interval, and a second illumination interval; and
 means, operable for each sequence of the series, for passing first bias, first pulse, second bias, and second pulse currents through the laser during respective first non-illumination, first illumination, a second non-illumination, and second illumination intervals, the first and second bias currents being below the threshold of the laser and the first and second pulse currents being above the threshold of the laser;
 the first and second bias currents being sufficiently different to establish different operating temperatures for the first and second illumination intervals;
 whereby the laser emits light during the first and second illumination intervals at different wavelengths due to the different operating temperatures.

15. The improvement of claim 14 wherein the first and second pulse currents have respective magnitudes and the first and second illumination intervals have respective durations such that total energy emitted by the laser is identical for the first and second illumination intervals.

16. The improvement of claim 14 wherein the first pulse current is substantially constant during the first illumination interval.

17. The improvement of claim 14 wherein the sequences occur without intervening time intervals between sequences.

18. The improvement of claim 14 wherein the laser is characterized by a sufficiently high threshold current and thermal impedance that the first and second bias currents differ sufficiently that the operating temperatures differ by at least 15° C.

19. The improvement of claim 14 wherein the wavelengths differ by at least 30 angstroms.

20. The improvement of claim 14 wherein the printer includes at least one dispersive element in the part of the beam emitted by the laser so as to provide a lateral offset between printed patterns resulting from the different wavelengths.

21. The improvement of claim 14 wherein the first pulse current decreases during the first illumination interval.

22. The improvement of claim 14 wherein the first pulse current comprises a plurality of spaced pulses occurring during the first illumination interval.

23. A method of operating a diode laser comprising the steps of:
 establishing a series of sequences, each sequence including a first non-illumination interval, a first illumination interval, a second non-illumination interval, and a second illumination interval;
 for each sequence of the series, passing first and second pulse currents through the laser during respective first and second illumination intervals, the first and second pulse currents being above the threshold of the laser; and
 for each sequence of the series, establishing different first and second operating temperatures for the first and second illumination intervals, said establishing step being performed during at least one of the first and second non-illumination intervals;
 whereby the laser emits light during the first and second illumination intervals at different wavelengths due to the different operating temperatures established during the first and second non-illumination intervals.

24. The method of claim 23 wherein the first and second pulse currents have respective magnitudes and the first and second illumination intervals have respective durations such that total energy emitted by the laser is identical for the first and second illumination intervals.

25. The method of claim 23 wherein the first pulse current is substantially constant during the first illumination interval.

26. The method of claim 23 wherein the sequences occur without intervening time intervals between sequences.

27. The method of claim 23 wherein said step of establishing different first and second operating temperatures comprises the substeps of:

passing first and second bias currents through the laser during respective first and second non-illumination intervals;

the first and second bias currents being below threshold and being sufficiently different so as to establish at least a significant portion of the difference between the first and second operating temperatures.

28. The method of claim 27 wherein the first and second bias currents differ sufficiently that the operating temperatures differ by at least 15° C.

29. The method of claim 23 wherein said step of establishing different first and second operating temperatures comprises the substep of:

transferring heat from a source outside the laser into the laser during only one of the first and second non-illumination intervals.

30. The improvement of claim 23 wherein the wavelengths differ by at least 30 angstroms.

31. The improvement of claim 23 wherein the first pulse current decreases during the first illumination interval.

32. The improvement of claim 23 wherein the first pulse current comprises a plurality of spaced pulses occurring during the first illumination interval.

33. A method of operating a diode laser comprising the steps of:

establishing a series of sequences, each sequence including a first non-illumination interval, a first illumination interval, a second non-illumination interval, and a second illumination interval; and for each sequence of the series, passing first bias, first pulse, second bias, and second pulse currents through the laser during respective first non-illumination, first illumination, second non-illumination, and second illumination intervals;

the first and second bias currents being below threshold and being sufficiently different so as to establish different operating temperatures for the first and second illumination intervals;

the first and second pulse currents being above threshold;

whereby the laser emits light during the first and second illumination intervals at different wavelengths due to the different operating temperatures.

34. The method of claim 33 wherein the first and second pulse currents have respective magnitudes and the first and second illumination intervals have respective durations such that total energy emitted by the laser is identical for the first and second illumination intervals.

35. The improvement of claim 33 wherein the first pulse current is substantially constant during the first illumination interval.

36. The method of claim 33 wherein the sequences occur without intervening time intervals between the sequences.

37. The method of claim 33 wherein the first and second bias currents differ sufficiently that the operating temperatures differ by at least 15° C.

38. The improvement of claim 33 wherein the wavelengths differ by at least 30 angstroms.

39. The improvement of claim 33 wherein the first pulse current decreases during the first illumination interval.

40. The improvement of claim 33 wherein the first pulse current comprises a plurality of spaced pulses occurring during the first illumination interval.

* * * * *